(No Model.)

J. D. TYNES.
NUT LOCK.

No. 558,440. Patented Apr. 14, 1896.

WITNESSES:
H. J. Dieterich
Edw. W. Byrn.

INVENTOR
Jefferson D. Tynes

BY Munn & Co.
ATTORNEYS.

UNITED STATES PATENT OFFICE.

JEFFERSON D. TYNES, OF FORT SMITH, ARKANSAS.

NUT-LOCK.

SPECIFICATION forming part of Letters Patent No. 558,440, dated April 14, 1896.

Application filed May 13, 1895. Serial No. 549,160. (No model.)

*To all whom it may concern:*

Be it known that I, JEFFERSON D. TYNES, of Fort Smith, in the county of Sebastian and State of Arkansas, have invented a new and useful Improvement in Nut-Locks, of which the following is a specification.

My invention is in the nature of an improved nut-lock of that type known as "resilient washers." It is more particularly designed for rail-joints, but applicable also to general uses; and it consists in the peculiar construction and arrangement of parts which I will now proceed to describe with reference to the drawings, in which—

Figure 1:
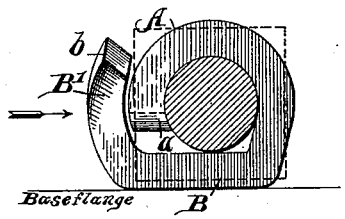
Figure 2:
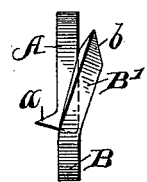
Figure 2A:
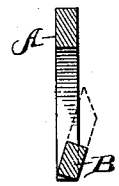
Figure 3:
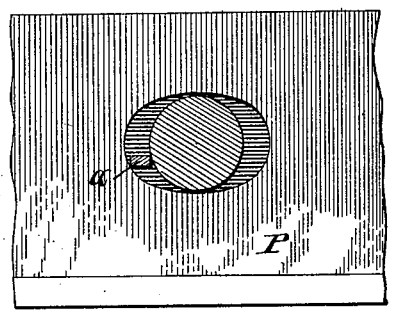

Figure 1 is a side view of the locking-washer applied to the bolt, the nut being shown in dotted lines. Fig. 2 is an edge view of the washer, looking in the direction of the arrow in Fig. 1; Fig. 2ª, a sectional view of a modification taken vertically through the center of the washer. Fig. 3 is a sectional view taken just behind the plane of the washer in Fig. 1, and Figs. 4, 5, and 6 are side views of modified forms of the washer.

Referring to Fig. 1, the washer is formed with separated ends, one of which ends A is curved closely around and hugs the bolt and the other end of which is formed with a straight portion B and an arm B', extending upwardly therefrom past the end A. The inner end A of this washer is formed with a spur $a$ at its end, which is turned at right angles toward the fish-plate or back-bearing for the washer and is intended when applied to a fish-plate or rail to enter the elliptical hole in the same beside the bolt, as shown in Fig. 3, and form an anchorage to keep the washer from turning. When applied to a back-bearing of wood, this spur buries itself in the wood. The other end B' of the washer is twisted inwardly toward the nut and sprung or bent forward, so as to lie partially within the plane of the same, and the extreme end $b$ of this arm is beveled. This part B' of the washer may be curved, as in Fig. 1, or straight, as in Fig. 5, and may be made longer or shorter, as desired. When made short, in order the better to cause its extreme end $b$ to pass into the plane of the nut, said end is not only twisted inwardly and sprung forward, but the straight part B of the washer is twisted or canted, as in Fig. 2ª, so as to throw its upper edge forwardly to give a greater departure of the arm B' from the plane of the end A.

The manner of locking the nut by this washer is as follows: When the nut is turned up on the bolt to a bearing against the washer, its corners ride up on the outwardly sprung and twisted arm B', forcing it back slightly until the corner of the nut reaches and passes the end $b$, as shown in dotted lines in Fig. 1, at which time the arm B' springs outwardly again into the plane of the nut and behind its corner, effectively preventing it from turning backward, unless strained by a wrench, under which circumstances it rides up on the beveled end $b$, and, forcing the arm B' back, passes by the same. The washer is locked against turning both by the spur $a$ in the elongated bolt-hole and by the flat side B of the washer, which latter lies against the base-flange of the fish-plate or rail and prevents the washer from turning.

As the bolt-holes in the fish-plates and rails are of different distances from the base-flanges of the fish-plates or rails, this straight portion B of the washer may be of different width to compensate for this. Thus in Fig. 4 this straight portion is made much thicker to accommodate rails or fish-plates P whose bolt-holes are higher above the base-flanges.

Figure 4:
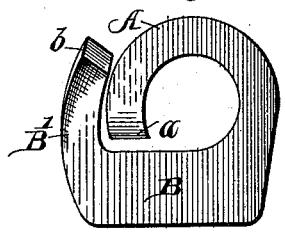
Figure 5:
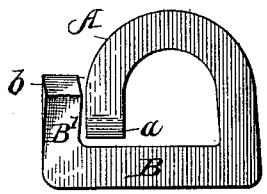
Figure 6:
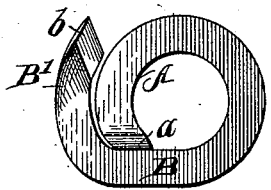

The washers may be stamped or cut from plate metal, as shown in Figs. 1, 4, and 5, or they may be formed of a bar bent around, as shown in Fig. 6.

Having thus described my invention, what I claim as new, and desire to secure by Letters Patent, is—

1. A nut-lock consisting of an open washer having its two ends juxtaposed and lapping past each other on parallel lines the outer end having a straight portion B running back from the point at which it passes the inner end and forming a part of the central hole, and said outer end being sprung forwardly, and provided with a smooth beveled face $b$ passing into the plane of the nut and adapted to lock the same or be forced back by the ridging of the nut on this bevel when the nut is unscrewed substantially as and for the purpose described.

2. A nut-lock consisting of an open washer having its two ends juxtaposed and lapped past each other on parallel lines the outer end having a straight portion B running back from the inner end and forming a part of the central hole, and said outer end being sprung forwardly and provided with a smooth beveled face $b$ passing into the plane of the nut and adapted to lock the same or be forced back by the riding of the nut on this bevel when the nut is unscrewed; and the inner end of the washer having a tooth or lug projecting at right angles to the plane of the washer and adapted to enter a cavity in the bearing-surface behind the washer to lock the washer against turning substantially as shown and described.

JEFFERSON D. TYNES.

Witnesses:
 JOHN S. PATTERSON,
 MARTIN J. HUBBLE.